United States Patent [19]

Boggs

[11] Patent Number: 5,040,900
[45] Date of Patent: * Aug. 20, 1991

[54] SLUDGE STABILIZING METHOD AND APPARATUS

[75] Inventor: Bruce E. Boggs, Roswell, Ga.

[73] Assignee: United States Pollution Control Company, Inc., Oklahoma City, Ohio

[*] Notice: The portion of the term of this patent subsequent to Jul. 24, 2007 has been disclaimed.

[21] Appl. No.: 520,941

[22] Filed: May 9, 1990

Related U.S. Application Data

[62] Division of Ser. No. 366,993, Jun. 16, 1989, Pat. No. 4,943,165.

[51] Int. Cl.$^5$ .......................... B01F 15/00; B01F 5/06
[52] U.S. Cl. ................................. 366/348; 37/141 R; 37/195; 366/343; 366/349; 414/722
[58] Field of Search ............... 366/342, 343, 345, 346, 366/348, 349, 150, 167, 173, 241, 219, 240; 414/722, 695.5; 37/57, 61, 62, 63, 103, 195, 78, 80 R, 118 R, 141 R

[56] References Cited

U.S. PATENT DOCUMENTS

| | | |
|---|---|---|
| 1,729,573 | 9/1929 | Finley .................. 366/345 |
| 1,816,522 | 7/1931 | Fundom . |
| 3,076,275 | 2/1963 | Boothe . |
| 3,145,488 | 8/1964 | French . |
| 3,643,821 | 2/1972 | Viel ..................... 414/722 |
| 3,855,370 | 12/1974 | Dodd . |
| 3,904,714 | 9/1975 | Rooney . |
| 3,921,316 | 11/1975 | Moreau .............. 414/722 |
| 4,021,349 | 5/1977 | Kaelin . |
| 4,066,383 | 1/1978 | Lakin . |
| 4,157,956 | 6/1979 | Robinson ............ 414/722 |
| 4,230,435 | 10/1980 | Azevedo . |
| 4,290,890 | 9/1981 | Bauer . |
| 4,448,690 | 5/1984 | Maphis . |
| 4,548,765 | 10/1985 | Hultholm . |
| 4,758,355 | 7/1988 | Levine ................ 366/345 |

OTHER PUBLICATIONS

Handbook for Stabilization/Solidification of Hazardous Wastes by u.S. Environmental Protection Agency, 6/86.

Primary Examiner—Robert W. Jenkins
Attorney, Agent, or Firm—Lowe, Price, LeBlanc & Becker

[57] ABSTRACT

A method and apparatus are described for injecting material into a waste sludge lagoon and mixing the material in the lagoon to solidify and stabilize the waste in-situ. The apparatus includes a slotted bucket adapted to be secured to the articulated arm of a backhoe or like equipment. The bucket has a manifold in the upper interior portion thereof which is coupled to a source of the additive or reagent material to be dispensed under pressure. In a preferred embodiment the material is a dry powder which is dispensed pneumatically through the manifold into the bucket and the waste as the bucket is moved back and forth through the waste lagoon. The manifold preferably is a cylinder having mutually spaced holes, slots or nozzles. The bucket also may have a vane structure across the scoop opening for further agitation of the sludge as it enters or leaves the bucket.

7 Claims, 2 Drawing Sheets

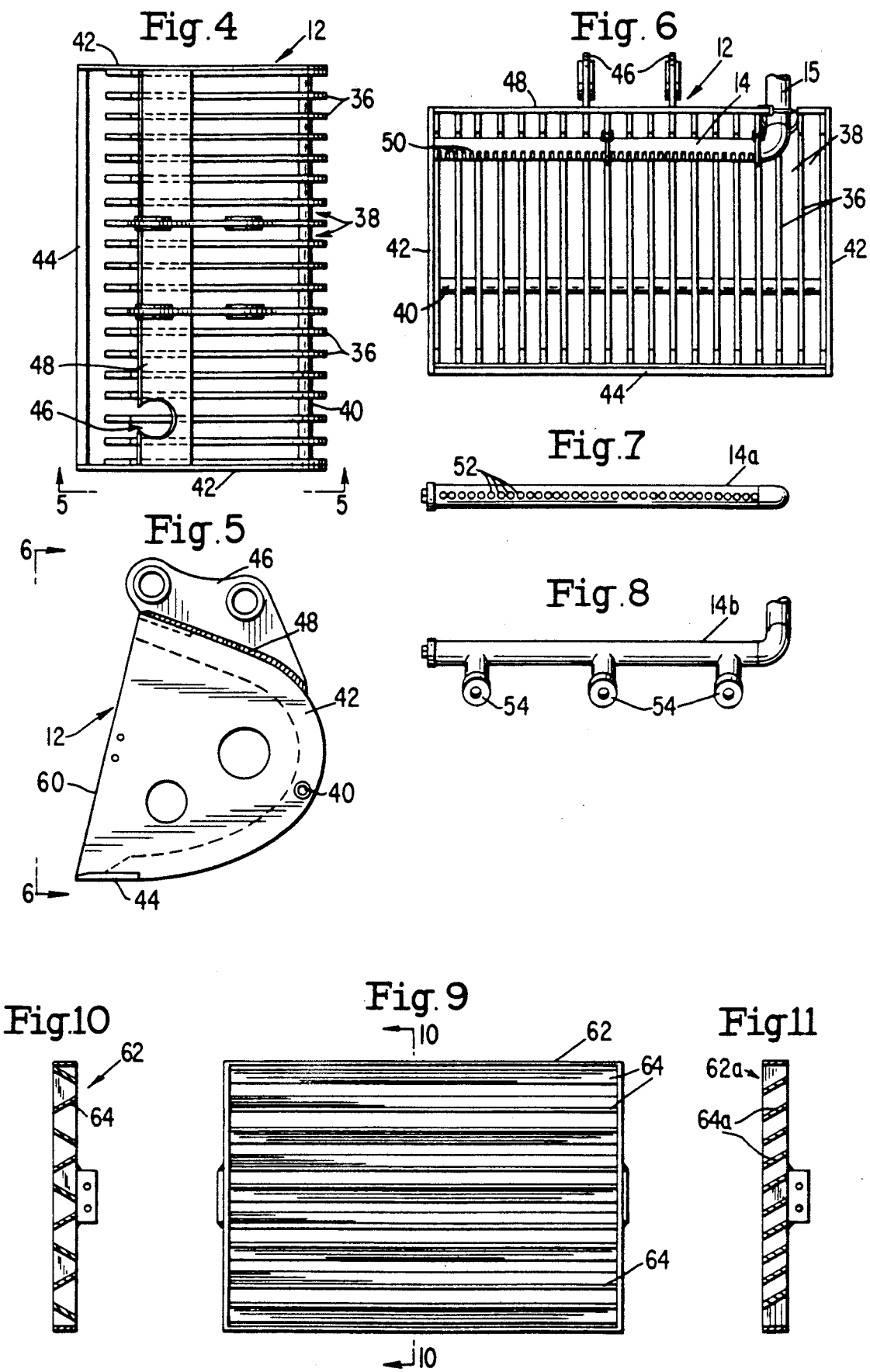

SLUDGE STABILIZING METHOD AND APPARATUS

This application is a division of application Ser. No. 07/366,093 filed Jun. 16, 1989, now U.S. Pat. No. 4,943,165.

FIELD OF THE INVENTION

This invention relates to a method and apparatus for stabilization and solidification of hazardous waste, and more particularly to an improved apparatus and method for injecting material into a sludge pond or lagoon containing liquid or sludge hazardous waste and mixing said material and waste to form a solidified and stabilized relatively uniform mixture.

BACKGROUND OF THE INVENTION

Stabilization and solidification of hazardous waste material are described in "Handbook for Stabilization/Solidification of Hazardous Waste" produced by the United States Environmental Protection Agency at the Hazardous Waste Engineering Research Laboratory, Cincinnati, Ohio and published in June of 1986 (hereafter called "June 1986 EPA Report"). Said June 1986 EPA Report is hereby incorporated by reference in its entirety.

The terms "stabilization" and "solidification" are used herein as in said June 1986 EPA Report. Stabilization techniques are generally those whose beneficial action is primarily through limiting the solubility or mobility of the contaminants in hazardous waste with or without change or improvement in the physical characteristics of the waste. Stabilization usually involves adding materials which ensure that the hazardous constituents are maintained in their least mobile or toxic form. Solidification implies that the beneficial results of treatment are obtained primarily, but not necessarily exclusively, through the production of solid waste material which has structural integrity. The contaminants do not necessarily interact chemically with reagents, but are mechanically locked within the solidified matrix and/or bonded to or surrounded by an impervious covering. Some of these techniques for treating hazardous wastes are also considered to be stabilization/solidification processes. The term "fixation" is often used in the waste treatment field to mean any of various stabilization/solidification processes such as described in said June 1986 EPA Report; "fixed" wastes are those that have been treated by such fixation processes.

Free liquids in solid wastes are the liquids which readily separate from the solid portion of a waste under ambient temperature and pressure. Current regulations prohibit disposal of solid waste containing free liquids without treatment by mixing with an absorbent material. Most waste materials considered for stabilization/solidification are liquids or sludges (semisolids). To prevent the loss of drainable liquid and improve the handling characteristics of the waste, a dry solid sorbent is generally added to the waste. The sorbent may interact chemically with the waste or may simply be wetted by the liquid part of the waste and retain the liquid. The most common sorbents used in treating hazardous waste include soil and waste products such as bottom ash, fly ash, or kiln dust from cement and lime manufacture. In general, selection of sorbent materials involves tradeoffs among chemical effects, costs, and amounts required to produce a solid product suitable for in-situ capping or burial. Though some sorbents are relatively inert, undesirable and even hazardous reactions can and do occur unless attention is paid to the potential for waste and sorbent to react.

Several generic treatment systems have been developed for waste stabilization and solidification. The volumes of waste involved at uncontrolled waste sites generally require use of only the least expensive systems that are effective. The large quantities and varieties of wastes that are usually present also require the use of adaptable systems that are effective over a wide range of conditions. Four alternative onsite stabilization/solidification systems are being used: (1) in-drum mixing, (2) in-situ mixing, (3) mobile plant mixing, and (4) area mixing. The present invention relates to in-situ solidification/stabilization mixing.

In-situ mixing is primarily used for closure of liquid or slurry holding ponds or lagoons. In-situ mixing is most applicable for the addition of large volumes of low reactivity solid chemicals. In-situ mixing has been used primarily for the treatment of low solids content slurries or sludges. Where applicable, in-situ mixing is usually the lowest cost alternative. However, quality control associated with in-situ mixing has been limited with the technology heretofore available. Further, in-situ mixing has been the most difficult hazardous waste treatment alternative in terms of control of safety and environmental considerations. Since the entire process is open to the atmosphere, problems include the generation of fugitive dust, odors, and vapors. It is required to minimize exposure of personnel and equipment to the waste materials being treated and dust, fire or other hazards, depending on the waste being handled. It is important to minimize reduction in production efficiency by reducing the extent and interference of protective apparatus and procedures employed to provide the level of protection meeting pertinent regulations.

An effective in-situ hazardous waste treatment system is desirable because it is the fastest and least expensive of the alternative treatment systems noted above. The speed and economy possible with an in-situ waste treatment system are largely due to the reduction in the amount of handling of the waste mass. Other than for mixing, the wastes are usually moved only once; or if the wastes are not too hazardous, they are often not even removed from the original waste lagoon but mixed and left in place. This method lends itself best to liquid or low-solids sludges which are easily mixed. Heretofore, heavy sludges have been mixed with heavy equipment like draglines or clamshells, but with a problem obtaining sufficient uniformity in the treated product. Major limitations of the prior known systems for in-situ treatment of hazardous wastes are the low amount of mixing attained and the inability to control accurately the proportion of reagent to waste which can result in a nonuniform, unevenly mixed final product. This can be overcome to some extent by using excess reagent to decrease zones of low reagent content, but that increases cost.

The simplest commercial solidification/stabilization system for in-situ mixing of hazardous wastes uses common construction machinery (typically a backhoe, bull dozer, or pull shovel) to accomplish the mixing process. Where large lagoons are being treated, clamshells and/or draglines have also been utilized. This technique is used for application to liquids or light flowable sludges having a high liquid content. The technique also is used for solidification/stabilization processes incorporating the addition of large amounts of bulk powdery solids (kiln dust, fly ash, etc.) to the waste materials. However, there are problems in obtaining uniform satisfactory mixing and good stabilization/solidification results with these prior systems. There are also problems of dust and other hazards. (See said June 1986 EPA Report, especially page 6-10.)

Two prior pieces of equipment which are designed and used specifically for in-situ waste mixing have been introduced commercially (see FIGS. 6-4 and 6-5 of said June 1986 EPA Report at page 6-16 and related discussion at pages 6-15 to 6-18 thereof). This equipment is mounted on the boom of a backhoe or like construction equipment. These systems pneumatically inject the reagent directly into the waste mass at the lower end of multiple elongated spaced cylinders which are used to stir and mix the wastes. Fly ash is delivered to the multi-barreled injection head via a compressed air system. Hydraulically driven augers in the lower section of each of the multiple spaced barrels force the fly ash out of the barrels into the basin waste contents. As fly ash is forced from the barrels into the waste, the boom simultaneously moves the injection head back and forth (in the plane of the boom) as well as up and down to mix the fly ash and basin contents. Pneumatic pressure on the fly ash delivery to the injection heads in this system causes loss of fly ash to the air at the basin surface which results in bursts of fly ash dust (or other reagent) which is objectionable.

This equipment has certain disadvantages; the auger blades were subject to fouling or clogging, the mixing achieved was not as complete as desired, and a high torque was required for mixing. Providing a substantially uniform mixture is important especially if the mixture is exothermic. The heat generated by a nonuniform mixture could result in spontaneous combustion, undesirable chemical breakdown, or the like.

The addition of a dry powdery material such as flyash or lime kiln dust can present a problem. The addition of the material to a lagoon can cause an exothermic reaction which could result in a fire. It is then desirable to mix the solid material with sufficient quantities of the liquid to dissipate heat generated. Furthermore, the dry material itself can be an airborne hazard and, therefore, it must be incorporated in the lagoon without creating an unacceptable amount of airborne dust.

Depending upon the type of lagoon, it may be desirable to inject liquids, gases, or slurries in addition. For example, it may be desirable to inject liquids such as peroxides to oxidize contaminants, or gases such as carbon dioxide to facilitate the formation of carbonate salts. It also is possible to inject slurries such as an activated carbon slurry for absorbency, and odor control.

The dry material added could be a material such as type C flyash, lime kiln dust, cement, or the like. Obviously then in the case of flyash or lime kiln dust, a hazardous dry material can be used in disposing of a lagoon also containing hazardous materials. Sufficient dry material should be added and mixed with the free water or liquid in the lagoon so that the mixture will gel or set within three days. The lagoon can either be capped and left in place or removed by truck to an appropriate landfill for spreading.

SUMMARY OF THE INVENTION

The present invention provides a new improved apparatus and method for more effectively injecting a variety of dry and other materials into a lagoon containing liquid or sludge hazardous waste to form with high efficiency a solidified/stabilized uniform mixture with better quality control, less dust and other hazards, and at lower net cost than obtainable with prior known systems for in-situ stabilization/solidification of hazardous waste sludges in ponds or lagoons.

The apparatus of a preferred embodiment of this invention includes a slotted or "rock" bucket which is mounted on a front end loader. Within the bucket is a manifold having holes, slots or nozzles directed into the bucket. Material to be injected is preferably pneumatically conveyed from a suitable source to the manifold and injected into the bucket as the bucket is dragged back and forth through the waste liquid or sludge material. In this way, the turbulence generated by the passage of the slotted bucket through the waste material will facilitate mixing of it and the injected material. The bucket is dragged or undulated back and forth as the additive material is injected into the waste until the desired quantity has been mixed into the lagoon. In the case of less viscous materials, the bucket could also have a set of vanes across the scoop opening thereof so that further turbulence would be generated as the bucket is passed back and forth through waste in the lagoon. In the case of heavily viscous waste materials, such vane structure would not be used as the drag created would be undesirable.

Accordingly it is an object of this invention to provide a means and method for dispensing solid, liquid or gaseous materials into a waste lagoon to form a substantially uniform stabilized/solidified mixture thereof efficiently and reliably.

It is another object of this invention to provide a slotted bucket attachment for a backhoe with an internal dispensing manifold disposed within the bucket so that material can be injected into the interior of the bucket as the bucket is dragged through the waste lagoon.

It is still another object of this invention to provide a method for mixing hazardous waste materials which will reliably and efficiently provide a solidified and stabilized substantially uniform mixture by dispensing additive material into a slotted bucket as the bucket is dragged through a waste lagoon or the like in which the bucket is immersed.

It is still another object of this invention to provide a mixing and dispensing apparatus for treating hazardous material consisting of a slotted bucket for a front end loader having a dispensing manifold therein for dispensing material into the bucket as the bucket is dragged through a lagoon containing waste wherein the dispensing manifold consists of a cylinder extending laterally across the bucket with mutually spaced holes, slots or nozzles directed into the bucket.

It is another object of the present invention to provide a new improved apparatus and method for more effective in-situ treatment of hazardous waste liquid or sludge in a lagoon or pond by injection of reagent to achieve improved solidification/stabilization results with more uniformity, better quality control, less dust, reduced fire and other hazards, and at lower cost than with prior known in-situ waste treatment systems. It is a related object of this invention to overcome various problems and shortcomings of prior apparatuses and methods for in-situ treatment of hazardous wastes in ponds and lagoons.

These and other objects will become readily apparent with reference to the drawings and following description wherein

BRIEF DESCRIPTION OF THE DRAWINGS

FIG. 4 is a top plan view of a preferred bucket embodiment used in this invention but without the manifold incorporated.

FIG. 5 is an end view taken along lines 5—5 of FIG. 4.

FIG. 6 is a front elevation looking along lines 6—6 of FIG. 5 and also showing one preferred manifold embodiment having spaced injection slots installed in the bucket.

FIG. 7 is a bottom view of an alternative preferred manifold with spaced injection holes instead of slots.

FIG. 8 is a perspective view of another alternative manifold having spaced injection nozzles.

FIG. 9 is a front elevation of a mixing exchanger front cover for the bucket comprising spaced vanes.

FIG. 10 is a cross-section taken along lines 10 10 of FIG. 9.

FIG. 11 is a cross-section similar to FIG. 10 but showing an alternative vane structure.

DETAILED DESCRIPTION OF THE INVENTION

Figure 1:
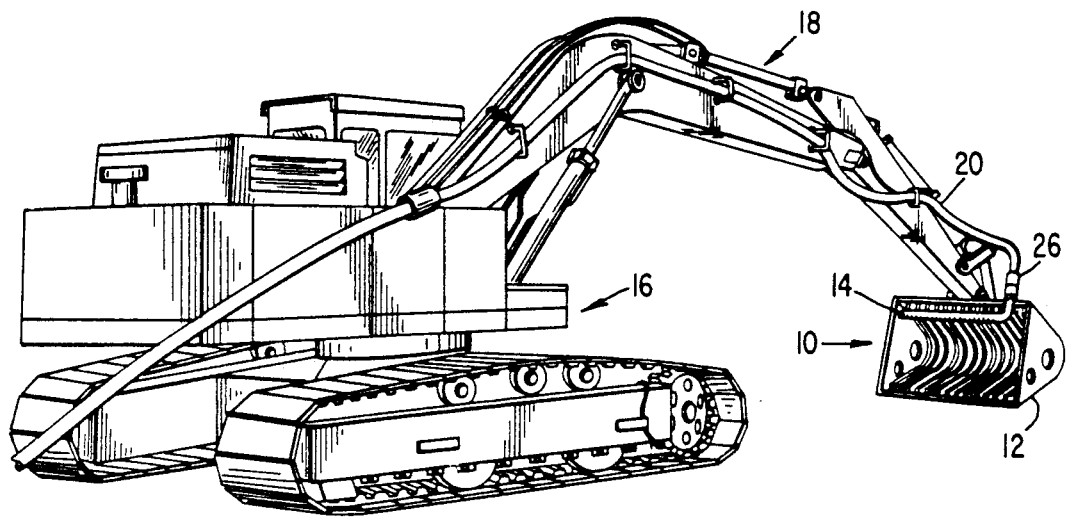
FIG. 1 is a perspective view of a preferred embodiment of this invention mounted on a tracked backhoe vehicle.

Referring now to the drawings and to FIGS. 1 and 2 in particular, the device of this invention 10 comprises a slotted bucket 12 with an internal dispensing manifold 14 constructed and used as subsequently described. (It is noted that slotted bucket 12 per se is structurally similar to a prior art "coal bucket" or "rock bucket"; however, such coal or rocket buckets have not been used in an apparatus combination and/or method for treating waste materials as herein disclosed, according to applicant's knowledge or information). The device is intended to be mounted on a conventional front end loader type vehicle 16 on the articulated arm 18 in place of the standard closed bucket heretofore used as described in said June 1986 EPA Report (see FIG. 6.3 on page 2-12 thereof).

Figure 2:
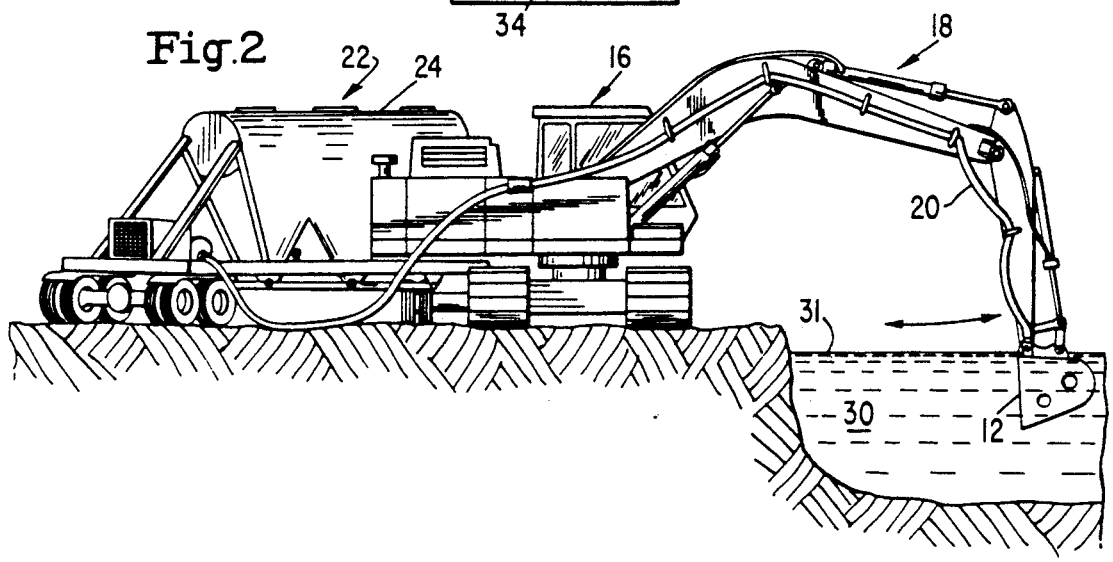
FIG. 2 is a side elevation of the device pictured in FIG. 1 working in a sludge pit and also showing a material supply vehicle.

Manifold 14 is supplied via conduit 20 which as shown in FIG. 2 extends from the bottom of a materials supply vehicle 22. Typically if the additive material to be dispensed is a powder such as flyash, lime kiln dust, or cement it will be dispensed from vehicle 22 pneumatically. An over pressure above the powder within the supply tank 24 of about 2 psi will generally be sufficient to convey the powder from tank 24 through conduit 20 to manifold 14. Preferably the air pressure will be adequate to entrain the particles, but not so high as to cause undue generation of dust. Typically the flow rate will not exceed about 25 tons per hour. A swivel joint 26 is preferably provided at manifold 14 to avoid kinking of the hose conduit 20.

Figure 3:
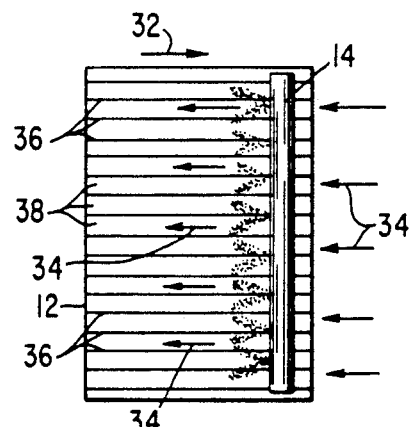
FIG. 3 is a diagrammatic view of the mixing bucket mixing waste slude and flyash, including a flow diagram.

In use, as shown in FIGS. 2 and 3, the bucket 12 is lowered into a waste lagoon 30 or pond which may contain any type of waste liquid or sludge. The bucket 12 is reciprocated at the end of arm 18 of backhoe 16. As shown in FIG. 3 schematically, as the bucket is moved in direction 32 the waste sludge shown by arrows 34 passes through the bucket slots 38 formed by bucket tines 36 whereupon turbulence will be created and the powder or material dispensed from manifold 14 will be injected into that turbulent region. This will cause a relatively uniform mixture of additive material in the liquid waste. Bucket 12 is then repeatedly passed back and forth through waste in lagoon 30 until sufficient additive material has been injected to result in stabilization and solidification of the waste 30 causing it to set or gel. Once the waste in the lagoon has stabilized, depending on the toxicity, it can be loaded in trucks and taken to a sanitary landfill where it is spread in the conventional fashion; or the waste in the lagoon may be stabilized and solidified so that the lagoon itself may be capped and left in place. Regulations of the Environmental Protection Agency govern these ways for waste disposal in the United States.

Referring now especially to FIGS. 4-6, the bucket of this invention 12 as noted above consists of a plurality of mutually spaced generally C-shaped members or tines 36 which form slots 38 therebetween. Tine members 36 are spaced along a frame member 40 which extends between bucket sides 42. A blade member 44 and a support member 48 also extend between bucket sides 42. Tine members 36 are typically spaced about three inches apart thus providing slots 38 about three inches wide in a bucket 12 having an overall width of about 72 inches and a front bucket opening 60 of about 48 inches high (i.e., 48"×72"). However, the size of bucket 12 and the spacing of tine members 36 and thus the width of slots 38 may be varied for treating wastes of different viscosities according to the present invention. A pair of conventional mounting brackets 46 are provided for attachment of the bucket 12 in conventional fashion to arm 18 of backhoe 16. An elbow section 15 of manifold 14 extends into the interior of bucket 12 through a hole 46 in support member 48.

In one preferred embodiment of this invention, manifold 14 is provided with a plurality of mutually spaced slots 50 along the length thereof for dispensing material. Slots 50 may be ¼ to ½" wide to minimize plugging and spaced apart a suitable distance depending upon the viscous nature of the sludge. For very viscous sludge the slots would be spaced relatively far apart and for less viscous sludge, they could be spaced closer together.

In a preferred alternative embodiment shown in FIG. 7, the slots 50 are replaced by mutually spaced holes 52 which extend along the length of the manifold 14a. Holes 52 should be at least about ¾" in diameter to minimize plugging. Holes 52 will be spaced apart a suitable distance depending on the viscosity of the sludge as discussed with reference to slots 50 of the FIG. 6 embodiment.

In the alternative embodiment of FIG. 8, mutually spaced nozzles 54 are provided along the length of manifold 14b. Nozzles 54 could be spaced apart on three inch centers approximately, or for very viscous sludges, the spacing could be increased up to about 6 inches.

With attention now to FIGS. 9-11 in an embodiment of this invention the open portion 60 of bucket 12 shown in FIG. 5 may be covered by a vane structure 62 or 62a consisting of a frame having longitudinal vanes 64 or 64a, respectively, extending the length thereof. FIGS. 10 and 11 show alternate arrangements for disposition of the vanes. Use of vane structures 62 or 62a increases turbulence as the bucket 12 is reciprocated and moves in a direction where the sludge enters the open scoop portion 60 of bucket 12. The sludge then scooped into the bucket 12 would be in turbulence as additive material is injected from manifold 14 thereinto. The sludge would then continue to pass through the bucket exiting through slots 38 whereby further turbulence would increase the mixing of the materials. Use of vane structure 62 or 62a is particularly suited to use with less viscous sludges; and such vane structures would not be used if the sludge was very viscous because of the extra drag created.

The vanes 64 and 64a of vane structures 62 and 62a, respectively are disposed at different angles as shown in FIGS. 10 and 11 for achieving different degrees of turbulence in different viscosity waste materials. The vanes 64 and 64a are disposed at a pitch angle of about 30° to horizontal as shown in FIGS. 10 and 11, respectively.

Referring particularly now to FIGS. 1, 2 and 6, in a preferred embodiment, (i) the slotted bucket 12 is immersed in waste 30 so that the apertures of the manifold (14, 14a or 14b) are located sufficiently below the surface 31 of waste 30, and (ii) powdered additive material is supplied under pressure applied in material supply vehicle 22 so that the additive material fed via conduit 20 is injected through the nozzles of the manifold at a velocity sufficient to secure good mixing of the additive material in the waste 30 but not at a velocity which is so high as to cause excessive dust above the surface 31 of waste 30.

As noted above, a powder which is regarded as a hazardous material can be used to stabilize the lagoon also containing a hazardous liquid or sludge material. In addition, as will be obvious to those skilled in the art, the device of this invention can be used to inject a variety of different substances in addition to dry powders into a lagoon. Liquid or gaseous neutralizing agents can be introduced, or chemicals or slurries for odor or other control. This invention is not intended to be limited to the type of material introduced into the lagoon although the use of lime kiln dust or flyash is particularly suited for use with the device of this invention to stabilize and solidify a waste sludge lagoon. Also as noted above, this invention is not intended to be limited to the type of sludge lagoon. Typically the invention will be used with a lagoon having a free water or other liquid content sufficient that regulations will not permit the transport of the lagoon waste. In addition, this invention contemplates stabilization and disposal of both liquids and powder materials that are shipped to a site. For example, a pit could be dug in a landfill or other suitable place and a liquid material shipped, for example in barrels, and dumped to fill the pit. A dry material then could be injected into the pit utilizing the method and apparatus of this invention to stabilize/solidify and dispose of such materials.

In summary, a method for stabilizing and solidifying waste sludge lagoons or the like, and an apparatus for injecting materials into said lagoons to provide a uniform mixture, is described. The device of this invention uses a slotted bucket attached to the articulated arm of a backhoe or similar equipment, with an internal manifold being disposed across an inside portion of the bucket with dispensing openings directed downwardly into the interior of the bucket. The bucket is then dragged back and forth through the waste lagoon as additive material is injected into the turbulent waste in the interior of the bucket. The turbulence generated as the sludge passes through the bucket slots promotes a more uniform mixture without internal moving parts. In an additional embodiment, the open scoop portion of the bucket is covered with a vane structure to further increase turbulence within the bucket, especially as the sludge enters the open scoop portion. When the bucket passes in the reverse direction then and sludge enters the slots, the sludge with material injected thereinto would exit the bucket through the vane whereby further turbulence would be generated to increase the mixing capability.

The method and apparatus of this invention then is a dependable and efficient means for stabilizing and solidifying a waste lagoon in-situ by injecting suitable materials into the waste lagoon. In the case of using a stabilizing powder, the method of this invention includes the use of powders such as lime kiln dust and flyash which are often hazardous with wastes but which when injected into the waste lagoon set to form a solidified stabilized mass.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. An apparatus for injecting and mixing a material into a liquid containing sludge in a lagoon, such apparatus comprising:

a bucket adapted to be attached to the articulated arm of a backhoe, said bucket having a scoop opening, spaced sides and a generally C-shaped body portion extending between the sides of said bucket, the body portion having a plurality of generally C-shaped tines spaced laterally along the width thereof between said sides providing slots therebetween so that sludge may pass through said bucket after entering through said scoop opening or said slots;

manifold means extending across the interior of said bucket between the sides thereof and having apertures therein for dispensing material into said bucket so that as sludge passes therethrough the dispensed material will be injected into the sludge; and reservoir means remote from said bucket for storing said material and conveying means for conveying said material to said manifold means.

2. The apparatus of claim 1 wherein said reservoir means includes a tank having an inlet and an outlet and said conveying means includes means for pressurizing the interior of said tank.

3. The apparatus of claim 2 wherein said conveying means further comprises a conduit extending from the outlet of said tank to said manifold means.

4. The apparatus of claim 3 wherein said material is a powder and said conveying means includes means for pneumatically conveying said powder through said conduit by supplying air pressure at the inlet to said tank.

5. A method for injecting and mixing a material into liquid containing sludge in a lagoon, such method comprising the steps of:

attaching to the articulated arm of a backhoe a bucket having a scoop opening, spaced sides, and a generally C-shaped body portion extending between the sides of said bucket, the body portion having a plurality of generally C-shaped tines spaced laterally along the width thereof between said sides providing slots therebetween so that sludge may pass through said bucket after entering either through said scoop opening or said slots; said bucket having a manifold means extending across the interior of said bucket between the sides thereof and having apertures therein for dispensing material into said bucket so that as sludge passes therethrough the dispensed material will be injected into the sludge;

providing a reservoir remote from said bucket containing the material to be dispensed; and conveying said material to said manifold means under pressure while causing said bucket to move through the sludge in said lagoon in a generally reciprocating undulating pattern while injecting said material into the sludge passing through said bucket.

6. The method of claim 5 wherein said reservoir is a tank having an inlet and an outlet and the material in said tank is under pressure.

7. The method of claim 6 wherein the material is a powder and the method further comprises the step of pneumatically conveying said material under pressure from said tank to said manifold means.

* * * * *

UNITED STATES PATENT AND TRADEMARK OFFICE
CERTIFICATE OF CORRECTION

PATENT NO. : 5,040,900

DATED : August 20, 1991

INVENTOR(S) : Bruce E. BOGGS

It is certified that error appears in the above-identified patent and that said Letters Patent is hereby corrected as shown below:

On the title page, under "Assignee":

Please delete "Ohio" and insert therefor --Oklahoma--

Signed and Sealed this

Twelfth Day of January, 1993

*Attest:*

DOUGLAS B. COMER

*Attesting Officer*  Acting Commissioner of Patents and Trademarks